(12) United States Patent
Käppi (10) Patent No.: US 12,359,918 B2
(45) Date of Patent: Jul. 15, 2025

(54) METHOD AND APPARATUS FOR RECOVERING FRAME ORIENTATION BETWEEN BODY AND VEHICLE FRAMES FOR AN INERTIAL NAVIGATION SYSTEM

(71) Applicant: HERE GLOBAL B.V., Eindhoven (NL)

(72) Inventor: Jani Käppi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 151 days.

(21) Appl. No.: 17/657,218

(22) Filed: Mar. 30, 2022

(65) Prior Publication Data

US 2023/0314142 A1 Oct. 5, 2023

(51) Int. Cl.
*G01C 21/16* (2006.01)
(52) U.S. Cl.
CPC .................................. *G01C 21/16* (2013.01)
(58) Field of Classification Search
CPC .... G01C 21/16; G01C 25/005; G01C 21/165; G01C 21/26; G01C 21/28; G01C 21/3423; G01C 21/12; G01C 21/3629; G01C 21/3626; G01C 21/3641; G01C 21/3655
See application file for complete search history.

(56) References Cited

U.S. PATENT DOCUMENTS

| | | | |
|---|---|---|---|
| 8,086,405 B2 | 12/2011 | Han et al. | |
| 9,383,209 B2 | 7/2016 | Bhardwaj et al. | |
| 9,797,727 B2 | 10/2017 | Georgy et al. | |
| 10,876,859 B2 | 12/2020 | El-Ghazal et al. | |
| 11,397,086 B2 * | 7/2022 | Saini | G01S 19/49 |
| 2011/0307173 A1 * | 12/2011 | Riley | G01C 21/165 |
| | | | 701/510 |
| 2014/0372026 A1 * | 12/2014 | Georgy | G01S 19/47 |
| | | | 701/469 |

(Continued)

OTHER PUBLICATIONS

Wang et al., "Determining Driver Phone Use by Exploiting Smartphone Integrated Sensors", publisher: IEEE, published: Aug. 2016 (Year: 2016).*

(Continued)

*Primary Examiner* — Wilson W Tsui
(74) *Attorney, Agent, or Firm* — ALSTON & BIRD LLP (57) ABSTRACT

A method, apparatus and computer program product are configured to re-estimate misalignment between the body frame of an inertial measurement unit (IMU) and the vehicle frame following movement of a mobile device embodying the sensor(s) of the IMU relative to the vehicle. In a method, movement of the mobile device relative to the vehicle is detected. In response to detecting movement of the mobile device relative to the vehicle, the method identifies (i) a point in time prior to or corresponding to commencement of movement of the mobile device relative to the vehicle and (ii) a subsequent point in time at which the mobile device is stable relative to the vehicle. The method then determines the frame orientation between body and vehicle frames. Based upon the determined frame orientation between body and vehicle frames, the method also includes determining a navigation solution for the vehicle in reliance upon non-holonomic constraints.

20 Claims, 4 Drawing Sheets

(56) References Cited

U.S. PATENT DOCUMENTS

| | | | |
|---|---|---|---|
| 2016/0252354 A1* | 9/2016 | Georgy | G01C 21/1654 |
| | | | 701/500 |
| 2018/0259350 A1* | 9/2018 | Al-Hamad | G01C 21/188 |
| 2020/0348136 A1* | 11/2020 | Jain | G01C 21/165 |
| 2021/0207961 A1 | 7/2021 | Saini et al. | |
| 2022/0011447 A1* | 1/2022 | Saini | G01S 19/428 |

OTHER PUBLICATIONS

Kang et al, "Practical Driving Analytics with Smartphone Sensors", 2017 IEEE Vehicular Networking Conference (VNC), (Nov. 27-29, 2017), 8 pages.

* cited by examiner

METHOD AND APPARATUS FOR RECOVERING FRAME ORIENTATION BETWEEN BODY AND VEHICLE FRAMES FOR AN INERTIAL NAVIGATION SYSTEM

TECHNOLOGICAL FIELD

An example embodiment relates generally to the recovery of the frame orientation between the body and vehicle frames for an inertial navigation system (INS) and, more particularly, to the recovery of the frame orientation between the body and vehicle frames for an INS following movement of a mobile device defining the body frame with respect to a vehicle defining the vehicle frame such that non-holonomic constraints can again be applied following recovery of the frame orientation in order to improve the navigation solution determined by the INS.

BACKGROUND

In order to determine its position, some vehicles rely upon an inertial navigation system (INS). The INS is carried by the vehicle and utilizes dead reckoning to determine the current position of the vehicle based upon a prior position of the vehicle in combination with motion data of the vehicle. The prior position of the vehicle may have been previously determined utilizing, for example, a satellite-based positioning technique, such as a Global Navigation Satellite System (GNSS)-based positioning technique. The INS may also include an inertial measurement unit (IMU) that determines the motion data defining the movement of the vehicle from the point in time at which the prior position was previously determined to a subsequent point in time at which the current position of the vehicle is determined by utilizing dead reckoning. In operation, the INS processes the measurements provided by the IMU and calculates, utilizing equations of motion, the vehicle states in the navigation frame defined by movement by the vehicle. The INS includes one or more filters to estimate the system errors and provides feedback to cancel or reduce the effect of the errors.

In order to improve the positioning performance of an INS in a dead-reckoning mode, the INS may apply non-holonomic constraints. In this regard, in an instance in which the vehicle is moving in a first direction, such as a forward or longitudinal direction, that defines the X axis, the vehicle typically does not slide laterally or jump vertically. Consequently, the non-holonomic constraints applied by the INS define the velocity $V_y$ in the lateral direction to be 0 or approximately 0 as shown, for example, in FIG. 1A. Similarly, the non-holonomic constraints applied by the INS define the velocity $V_z$ in the vertical direction to also be 0 or close to 0 as shown in FIG. 1B.

Figure 1A:
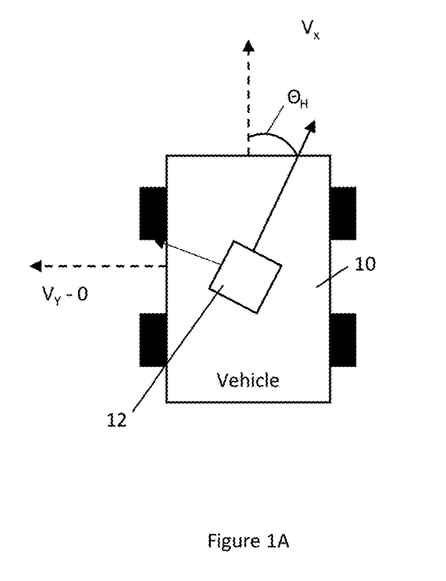
FIGS. 1A and 1B illustrate the misalignment of a body frame defined by a mobile device, such as a mobile device containing one or more sensors of an inertial measurement unit (IMU), to a vehicle frame defined by a vehicle and the application of the non-holonomic constraints.
Figure 1B:
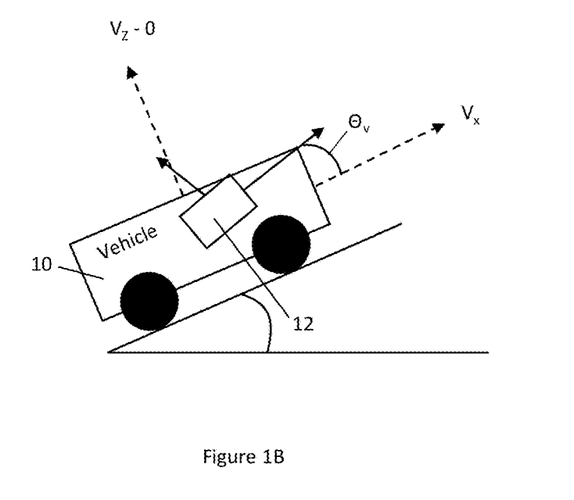

In order to determine the position of the vehicle utilizing dead reckoning, the misalignment of the body frame, that is, the coordinate system defined by the sensors of the IMU as shown in FIGS. 1A and 1B, with respect to the vehicle frame, that is, the coordinate system defined by the frame of the vehicle, must be estimated and must remain constant in order to properly apply the non-holonomic constraints. Some INS' include IMUs attached to the vehicle frame such that the IMU is not capable of moving with respect to the vehicle frame. These INS' are therefore configured to identify an error in an instance in which the IMU is determined to have moved with respect to the vehicle frame. However, other IMUs may be embodied by a mobile device, such as a mobile telephone, a portable navigation device or the like. In these instances, movement of the mobile device embodying the IMU relative to the vehicle and the corresponding change in orientation between the body frame and the vehicle frame can result in erroneous application of the non-holonomic constraints such that the resulting position of the vehicle that is determined by the INS has reduced accuracy.

As such, some INS' that include IMUs embodied by a mobile device are configured to discontinue reliance upon the non-holonomic constraints in an instance in which the mobile device is moved relative to the vehicle. As a result of the discontinuation of the non-holonomic constraints, the resulting determination of the position of the vehicle by the INS may experience increased drift, such as due to the impact of temperature upon the sensors, and may also have decreased accuracy.

Following movement of a mobile device embodying the IMU relative to the vehicle, the mobile device that includes the IMU may again be positioned in a fixed position relative to the vehicle. Once the mobile device containing the IMU has again been placed in a fixed position relative to the vehicle, the INS can re-estimate the misalignment between the body frame of the IMU and the vehicle frame and can then again apply the non-holonomic constraints to obtain a navigation solution with increased accuracy. However, the re-estimation of the misalignment may be a time consuming process during which the INS continues to determine the navigation solution without reliance upon the non-holonomic constraints such that the resulting navigation solution continues to experience increased drift and decreased accuracy.

BRIEF SUMMARY

A method, apparatus and computer program product are provided in accordance with an example embodiment in order to re-estimate the misalignment between the body frame of an inertial measurement unit (IMU) and the vehicle frame in a more-timely manner following movement of a mobile device embodying the sensor(s) of the IMU relative to the vehicle. As such, the method, apparatus and computer program product of an example embodiment provide for the determination of the position of the vehicle following the movement of a mobile device containing the sensors of the IMU relative to the vehicle in a manner that promptly recommences utilization of the non-holonomic constraints in order to more accurately determine the position of the vehicle. As a result of the timely manner in which the misalignment between the body frame and the vehicle frame is re-estimated and the non-holonomic constraints are again applied in conjunction with the determination of the position of the vehicle, the method, apparatus and computer program product limit the errors in position attributable to drift to a more limited period of time in order to provide improved performance with respect to the determination of a navigation solution for the vehicle.

In an example embodiment, a method is provided for recovering of frame orientation between body and vehicle frames for an inertial navigation system (INS) following movement of a mobile device defining the body frame with respect to a vehicle defining the vehicle frame. The method includes detecting movement of the mobile device relative to the vehicle. In response to detecting movement of the mobile device relative to the vehicle, the method identifies (i) a point in time prior to or corresponding to commencement of movement of the mobile device relative to the vehicle and (ii) a subsequent point in time at which the mobile device is stable relative to the vehicle. Following the identifying, the method determines the frame orientation between body and vehicle frames. Based upon the determined frame orientation between body and vehicle frames, the method also includes determining a navigation solution for the vehicle in reliance upon non-holonomic constraints. In an example embodiment, the method identifies the subsequent point in time by forward processing sensor samples of the INS from the point in time prior to or corresponding to commencement of movement of the mobile device relative to the vehicle to the subsequent point in time at which the mobile device is stable relative to the vehicle. The method of this example embodiment forward processes the sensor samples by utilizing filter parameters of one or more filters of the INS and sensor samples stored by a history buffer without application of non-holonomic constraints.

The navigation solution of an example embodiment applies the non-holonomic constraints before detecting the movement of the mobile device. In response to detecting the movement of the mobile device, the method of this example embodiment also includes halting application of the non-holonomic constraints. In another example embodiment, the method identifies the subsequent point in time at which the mobile device is stable relative to the vehicle by identifying the subsequent point in time substantially corresponding to completion of the movement of the mobile device relative to the vehicle.

The method of an example embodiment detects movement of the mobile device relative to the vehicle by determining that the mobile device has moved relative to the vehicle based upon a comparison of vehicle orientation as determined by the INS with respect to one or more predefined conditions. In another example embodiment, the method detects movement of the mobile device relative to the vehicle by detecting a pattern of features extracted from the sensor samples of the INS to be indicative of movement of the mobile device relative to the vehicle. The method of an example embodiment detects movement of the mobile device relative to the vehicle by triggering a determination as to whether the mobile device has moved relative to the vehicle based upon a user action relative to the mobile device. In this example embodiment, the method may identify the point in time prior to or corresponding to commencement of movement of the mobile device relative to the vehicle by identifying the point in time based upon a point in time at which the user action relative to the mobile device commences.

In relation to identifying the point in time prior to or corresponding to commencement of movement of the mobile device relative to the vehicle, the method of an example embodiment includes backwards processing sensor samples stored by the history buffer in order to propagate a state of the one or more filters of the INS in a reverse chronological direction and identifying the point in time prior to or corresponding to commencement of movement of the mobile device relative to the vehicle based upon stabilization of an orientation of the vehicle. In another example embodiment, the method identifies the point in time prior to or corresponding to commencement of movement of the mobile device relative to the vehicle by backwards processing sensor samples stored by the history buffer in order to propagate a state of the one or more filters of the INS in a reverse chronological direction. The method of this example embodiment also identifies the point in time prior to or corresponding to commencement of movement of the mobile device relative to the vehicle based upon a comparison of the state of the one or more filters of the INS as determined from the backwards processing to the state of the one or more filters of the INS as defined by the filter parameters of the one or more filters of the INS that are stored by the history buffer.

The method of an example embodiment determines the frame orientation between the body and vehicle frames by determining a difference in orientation between the orientation of mobile device at the point in time prior to or corresponding to commencement of movement of the mobile device relative to the vehicle and the orientation of the mobile device at the subsequent point in time at which the mobile device is stable relative to the vehicle. In this example embodiment, the method also determines the frame orientation based upon the frame orientation at the point in time prior to or corresponding to commencement of movement of the mobile device relative to the vehicle and also based upon the difference in orientation. In another example embodiment, the method determines the frame orientation between the body and vehicle frames by determining the frame orientation based upon a velocity of the vehicle at the point in time at which the mobile device is stable relative to the vehicle.

In another example embodiment, an apparatus is provided that is configured to recover frame orientation between body and vehicle frames for an inertial navigation system (INS) following movement of a mobile device defining the body frame with respect to a vehicle defining the vehicle frame. The apparatus includes at least one processor and at least one memory including computer program code with the at least one memory and the computer program code configured to, with the at least one processor, cause the apparatus at least to detect movement of the mobile device relative to the vehicle. In response to detecting movement of the mobile device relative to the vehicle, the at least one memory and the computer program code are configured to, with the at least one processor, cause the apparatus to identify (i) a point in time prior to or corresponding to commencement of movement of the mobile device relative to the vehicle and (ii) a subsequent point in time at which the mobile device is stable relative to the vehicle. Following the identifying, the at least one memory and the computer program code are also configured to, with the at least one processor, cause the apparatus to determine the frame orientation between body and vehicle frames. Based upon the determined frame orientation between body and vehicle frames, the at least one memory and the computer program code are further configured to, with the at least one processor, cause the apparatus to determine a navigation solution for the vehicle in reliance upon non-holonomic constraints. In an example embodiment, the at least one memory and the computer program code are configured to, with the at least one processor, cause the apparatus to identify the subsequent point in time by forward processing sensor samples of the INS from the point in time prior to or corresponding to commencement of movement of the mobile device relative to the vehicle to the subsequent point in time at which the mobile device is stable relative to the vehicle. The at least one memory and the computer program code are also configured to, with the at least one processor, cause the apparatus of this example embodiment to forward processes the sensor samples by utilizing filter parameters of one or more filters of the INS and sensor samples stored by a history buffer without application of non-holonomic constraints.

The navigation solution of an example embodiment applies the non-holonomic constraints before detecting the movement of the mobile device. In response to detecting the movement of the mobile device, the at least one memory and the computer program code are configured to, with the at least one processor, cause the apparatus of this example embodiment to determine the navigation solution by halting application of the non-holonomic constraints. In another example embodiment, the at least one memory and the computer program code are configured to, with the at least one processor, cause the apparatus to identify the subsequent point in time at which the mobile device is stable relative to the vehicle by identifying the subsequent point in time substantially corresponding to completion of the movement of the mobile device relative to the vehicle.

The at least one memory and the computer program code are configured to, with the at least one processor, cause the apparatus of an example embodiment to detect movement of the mobile device relative to the vehicle by determining that the mobile device has moved relative to the vehicle based upon a comparison of vehicle orientation as determined by the INS with respect to one or more predefined conditions. In another example embodiment, the at least one memory and the computer program code are configured to, with the at least one processor, cause the apparatus to detect movement of the mobile device relative to the vehicle by detecting a pattern of features extracted from the sensor samples of the INS to be indicative of movement of the mobile device relative to the vehicle. The at least one memory and the computer program code are configured to, with the at least one processor, cause the apparatus of an example embodiment to detect movement of the mobile device relative to the vehicle by triggering a determination as to whether the mobile device has moved relative to the vehicle based upon a user action relative to the mobile device. In this example embodiment, the at least one memory and the computer program code are configured to, with the at least one processor, cause the apparatus to identify the point in time prior to or corresponding to commencement of movement of the mobile device relative to the vehicle by identifying the point in time based upon a point in time at which the user action relative to the mobile device commences.

In relation to identifying the point in time prior to or corresponding to commencement of movement of the mobile device relative to the vehicle, the at least one memory and the computer program code are configured to, with the at least one processor, cause the apparatus of an example embodiment to backwards process sensor samples stored by the history buffer in order to propagate a state of the one or more filters of the INS in a reverse chronological direction and identifying the point in time prior to or corresponding to commencement of movement of the mobile device relative to the vehicle based upon stabilization of an orientation of the vehicle. In another example embodiment, the at least one memory and the computer program code are configured to, with the at least one processor, cause the apparatus to identify the point in time prior to or corresponding to commencement of movement of the mobile device relative to the vehicle by backwards processing sensor samples stored by the history buffer in order to propagate a state of the one or more filters of the INS in a reverse chronological direction. The at least one memory and the computer program code are configured to, with the at least one processor, cause the apparatus of this example embodiment to identify the point in time prior to or corresponding to commencement of movement of the mobile device relative to the vehicle based upon a comparison of the state of the one or more filters of the INS as determined from the backwards processing to the state of the one or more filters of the INS as defined by the filter parameters of the one or more filters of the INS that are stored by the history buffer.

The at least one memory and the computer program code are configured to, with the at least one processor, cause the apparatus of an example embodiment to determine the frame orientation between the body and vehicle frames by determining a difference in orientation between the orientation of mobile device at the point in time prior to or corresponding to commencement of movement of the mobile device relative to the vehicle and the orientation of the mobile device at the subsequent point in time at which the mobile device is stable relative to the vehicle. In this example embodiment, the at least one memory and the computer program code are configured to, with the at least one processor, cause the apparatus to determine the frame orientation based upon the frame orientation at the point in time prior to or corresponding to commencement of movement of the mobile device relative to the vehicle and also based upon the difference in orientation. In another example embodiment, the at least one memory and the computer program code are configured to, with the at least one processor, cause the apparatus to determine the frame orientation between the body and vehicle frames by determining the frame orientation based upon a velocity of the vehicle at the point in time at which the mobile device is stable relative to the vehicle.

In a further example embodiment, a computer program product is provided that is configured to recover of frame orientation between body and vehicle frames for an inertial navigation system (INS) following movement of a mobile device defining the body frame with respect to a vehicle defining the vehicle frame. The computer program product includes at least one non-transitory computer-readable storage medium having computer-executable program code instructions stored therein with the computer-executable program code instructions including program code instructions to detect movement of the mobile device relative to the vehicle. In response to detecting movement of the mobile device relative to the vehicle, the computer-executable program code instructions include program code instructions to identifying (i) a point in time prior to or corresponding to commencement of movement of the mobile device relative to the vehicle and (ii) a subsequent point in time at which the mobile device is stable relative to the vehicle. Following the identifying, the computer-executable program code instructions also include program code instructions to determine the frame orientation between body and vehicle frames. Based upon the determined frame orientation between body and vehicle frames, the computer-executable program code instructions further include program code instructions to determine a navigation solution for the vehicle in reliance upon non-holonomic constraints. In an example embodiment, the computer-executable program code instructions to identify the subsequent point in time include program code instructions to forward process sensor samples of the INS from the point in time prior to or corresponding to commencement of movement of the mobile device relative to the vehicle to the subsequent point in time at which the mobile device is stable relative to the vehicle. The program code instructions to forward process the sensor samples include program code instructions to utilize filter parameters of one or more filters of the INS and sensor samples stored by a history buffer without application of non-holonomic constraints.

The navigation solution of an example embodiment applies the non-holonomic constraints before detecting the movement of the mobile device. In response to detecting the movement of the mobile device, the program code instructions of this example embodiment to determine the navigation solution include program code instructions to halt application of the non-holonomic constraints. In another example embodiment, the program code instructions to identify the subsequent point in time at which the mobile device is stable relative to the vehicle include program code instructions to identify the subsequent point in time substantially corresponding to completion of the movement of the mobile device relative to the vehicle.

The program code instructions of an example embodiment to detect movement of the mobile device relative to the vehicle include program code instructions to determine that the mobile device has moved relative to the vehicle based upon a comparison of vehicle orientation as determined by the INS with respect to one or more predefined conditions. In another example embodiment, the program code instructions to detect movement of the mobile device relative to the vehicle include program code instructions to detect a pattern of features extracted from the sensor samples of the INS to be indicative of movement of the mobile device relative to the vehicle. The program code instructions of an example embodiment to detect movement of the mobile device relative to the vehicle include program code instructions to trigger a determination as to whether the mobile device has moved relative to the vehicle based upon a user action relative to the mobile device. In this example embodiment, the program code instructions to identify the point in time prior to or corresponding to commencement of movement of the mobile device relative to the vehicle may include program code instructions to identify the point in time based upon a point in time at which the user action relative to the mobile device commences.

In relation to identifying the point in time prior to or corresponding to commencement of movement of the mobile device relative to the vehicle, the program code instructions of an example embodiment include program code instructions to backwards process sensor samples stored by the history buffer in order to propagate a state of the one or more filters of the INS in a reverse chronological direction and program code instructions to identify the point in time prior to or corresponding to commencement of movement of the mobile device relative to the vehicle based upon stabilization of an orientation of the vehicle. In another example embodiment, the program code instructions to identify the point in time prior to or corresponding to commencement of movement of the mobile device relative to the vehicle include program code instructions to backwards process sensor samples stored by the history buffer in order to propagate a state of the one or more filters of the INS in a reverse chronological direction. In this example embodiment, the identification of the point in time prior to or corresponding to commencement of movement of the mobile device relative to the vehicle is based upon a comparison of the state of the one or more filters of the INS as determined from the backwards processing to the state of the one or more filters of the INS as defined by the filter parameters of the one or more filters of the INS that are stored by the history buffer.

The program code instructions of an example embodiment to determine the frame orientation between the body and vehicle frames include program code instructions to determine a difference in orientation between the orientation of mobile device at the point in time prior to or corresponding to commencement of movement of the mobile device relative to the vehicle and the orientation of the mobile device at the subsequent point in time at which the mobile device is stable relative to the vehicle. In this example embodiment, the determination of the frame orientation is based upon the frame orientation at the point in time prior to or corresponding to commencement of movement of the mobile device relative to the vehicle and also based upon the difference in orientation. In another example embodiment, the program code instructions to determine the frame orientation between the body and vehicle frames include program code instructions to determine the frame orientation based upon a velocity of the vehicle at the point in time at which the mobile device is stable relative to the vehicle.

In yet another example embodiment, an apparatus is provided that is configured to recover frame orientation between body and vehicle frames for an inertial navigation system (INS) following movement of a mobile device defining the body frame with respect to a vehicle defining the vehicle frame. The apparatus includes means for detecting movement of the mobile device relative to the vehicle. In response to detecting movement of the mobile device relative to the vehicle, the apparatus includes means for identifying (i) a point in time prior to or corresponding to commencement of movement of the mobile device relative to the vehicle and (ii) a subsequent point in time at which the mobile device is stable relative to the vehicle. Following the identifying, the apparatus includes means for determining the frame orientation between body and vehicle frames. Based upon the determined frame orientation between body and vehicle frames, the apparatus also includes means for determining a navigation solution for the vehicle in reliance upon non-holonomic constraints. In an example embodiment, the means for identifying the subsequent point in time include means for forward processing sensor samples of the INS from the point in time prior to or corresponding to commencement of movement of the mobile device relative to the vehicle to the subsequent point in time at which the mobile device is stable relative to the vehicle. The means for forward processes the sensor samples includes means for utilizing filter parameters of one or more filters of the INS and sensor samples stored by a history buffer without application of non-holonomic constraints.

The navigation solution of an example embodiment applies the non-holonomic constraints before detecting the movement of the mobile device. In response to detecting the movement of the mobile device, the means for determining the navigation solution include means for halting application of the non-holonomic constraints. In another example embodiment, the means for identifying the subsequent point in time at which the mobile device is stable relative to the vehicle includes means for identifying the subsequent point in time substantially corresponding to completion of the movement of the mobile device relative to the vehicle.

The means for detecting movement of the mobile device relative to the vehicle includes means for determining that the mobile device has moved relative to the vehicle based upon a comparison of vehicle orientation as determined by the INS with respect to one or more predefined conditions. In another example embodiment, the means for detecting movement of the mobile device relative to the vehicle includes means for detecting a pattern of features extracted from the sensor samples of the INS to be indicative of movement of the mobile device relative to the vehicle. The means for detecting movement of the mobile device relative to the vehicle includes, in one example embodiment, means for triggering a determination as to whether the mobile device has moved relative to the vehicle based upon a user action relative to the mobile device. In this example embodiment, the means for identifying the point in time prior to or corresponding to commencement of movement of the mobile device relative to the vehicle includes means for identifying the point in time based upon a point in time at which the user action relative to the mobile device commences.

In relation to identifying the point in time prior to or corresponding to commencement of movement of the mobile device relative to the vehicle, the apparatus of an example embodiment includes means for backwards processing sensor samples stored by the history buffer in order to propagate a state of the one or more filters of the INS in a reverse chronological direction and means for identifying the point in time prior to or corresponding to commencement of movement of the mobile device relative to the vehicle based upon stabilization of an orientation of the vehicle. In another example embodiment, the means for identifying the point in time prior to or corresponding to commencement of movement of the mobile device relative to the vehicle includes means for backwards processing sensor samples stored by the history buffer in order to propagate a state of the one or more filters of the INS in a reverse chronological direction. In this example embodiment, the identification of the point in time prior to or corresponding to commencement of movement of the mobile device relative to the vehicle is based upon a comparison of the state of the one or more filters of the INS as determined from the backwards processing to the state of the one or more filters of the INS as defined by the filter parameters of the one or more filters of the INS that are stored by the history buffer.

The means for determining the frame orientation between the body and vehicle frames includes, in one example embodiment, means for determining a difference in orientation between the orientation of mobile device at the point in time prior to or corresponding to commencement of movement of the mobile device relative to the vehicle and the orientation of the mobile device at the subsequent point in time at which the mobile device is stable relative to the vehicle. In this example embodiment, the means for determining the frame orientation includes means for determining the frame orientation based upon the frame orientation at the point in time prior to or corresponding to commencement of movement of the mobile device relative to the vehicle and also based upon the difference in orientation. In another example embodiment, the means for determining the frame orientation between the body and vehicle frames includes means for determining the frame orientation based upon a velocity of the vehicle at the point in time at which the mobile device is stable relative to the vehicle.

BRIEF DESCRIPTION OF THE DRAWINGS

Having thus described example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided in accordance with an example embodiment in order to recover the frame orientation between a body frame and a vehicle frame for an inertial navigation system (INS) following movement of the mobile device defining the body frame with respect to a vehicle defining the vehicle frame. In this regard, the mobile device generally includes one or more sensors, such as one or more accelerometers, magnetometers, gyroscopes, or the like for capturing various parameters representative of the mobile device and, in turn, the vehicle. In this regard, the sensors may be configured to determine the movement of the mobile device along the respective coordinate axes of the body frame and/or the rotation of the mobile device about the respective coordinate axes of the body frame. In one embodiment, the mobile device is configured to embody an inertial measurement unit (IMU) which, in turn, includes the one or more sensors.

As depicted in FIGS. 1A and 1B, the mobile device 10 is configured to be carried by a vehicle 12 and to generally move in concert with the vehicle. The vehicle may be any of a wide variety of vehicles including, for example, an automobile, a truck, a scooter, or any other type of terrestrial vehicle. As a result of the movement of the vehicle along a road or other surface, the velocity of the vehicle in its direction of travel may be defined to be $V_x$. Since the vehicle is unlikely to move, at least in any appreciable amount, in a lateral direction or in a vertical direction, non-holonomic constraints may be applied such that the velocity $V_y$ in the lateral direction and the velocity $V_z$ in the vertical direction can be set equal to 0 or substantially equal to 0. By applying the non-holonomic constraints, the accuracy with which the position of the vehicle is determined by the INS may be enhanced.

As also shown in FIGS. 1A and 1B, the mobile device 10 is carried by the vehicle 12 and generally moves therewith. The mobile device may be any of a wide variety of mobile devices including, for example, a personal digital assistant (PDA), mobile telephone, smart phone, personal navigation device, smart watch, tablet computer, or the like. As also shown in FIGS. 1A and 1B, the body frame defined by the mobile device may be misaligned relative to the vehicle frame, such as by being misaligned in the horizontal XY plane as indicated in FIG. 1A by angle $\Theta_H$ and by being misaligned in the vertical XZ plane as indicated in FIG. 1B by the angle $\Theta_Z$.

In addition to including or otherwise being in communication with one or more sensors, such as one or more accelerometers, magnetometers, gyroscopes or the like, that are configured to identify movement along and/or rotation about each of the coordinate axes of the body frame, the mobile device 10 includes or is otherwise in communication with an apparatus 20 that is configured to recover the frame orientation between a body frame and a vehicle frame for the INS following movement of the mobile device with respect to the vehicle carrying the mobile device. The apparatus may be embodied by the mobile device, by an IMU or the like and, in one embodiment, includes, is associated with or as in communication with processing circuitry 22, a memory device 24 and a communication interface 26, as shown in FIG. 2.

Figure 2:
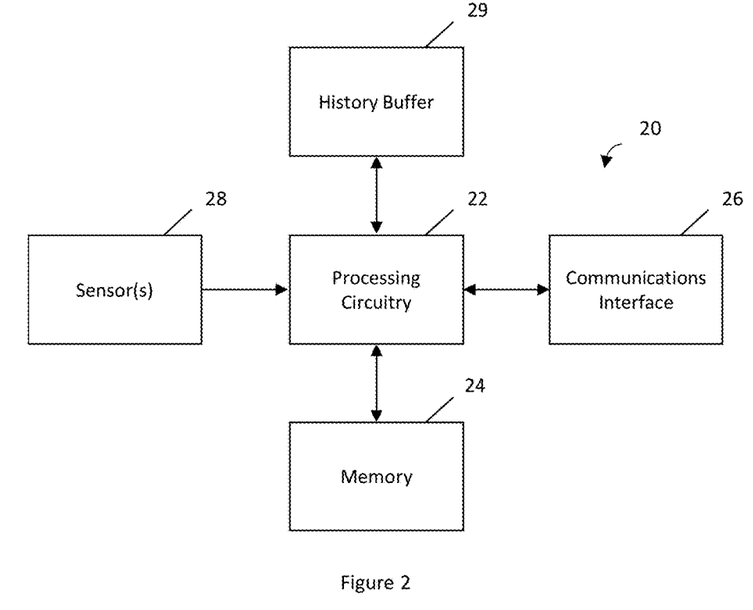
FIG. 2 is a block diagram of an apparatus that may be specifically configured in accordance with an example embodiment in order to recover the frame orientation between the body and vehicle frames for an inertial navigation system (INS) in accordance with an example embodiment.

As shown in FIG. 2, the apparatus 20 of an example embodiment may include one or more sensors 28, such as one or more accelerometers, magnetometers, gyroscopes or the like, for determining the movement of the apparatus along and/or rotation of the apparatus about the respective axes of the body frame defined by the mobile device 10. Alternatively, the one or more sensors may be external to the apparatus, but may be in communication therewith.

In some embodiments, the processing circuitry 22 (and/or co-processors or any other processors assisting or otherwise associated with the processing circuitry) can be in communication with the memory device 24 via a bus for passing information among components of the apparatus 20. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory device 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26. The communication interface can be any means such as a device or circuitry embodied in either hardware or a combination of hardware and software that is configured to receive and/or transmit data from/to other electronic devices in communication with the apparatus. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Figure 3:
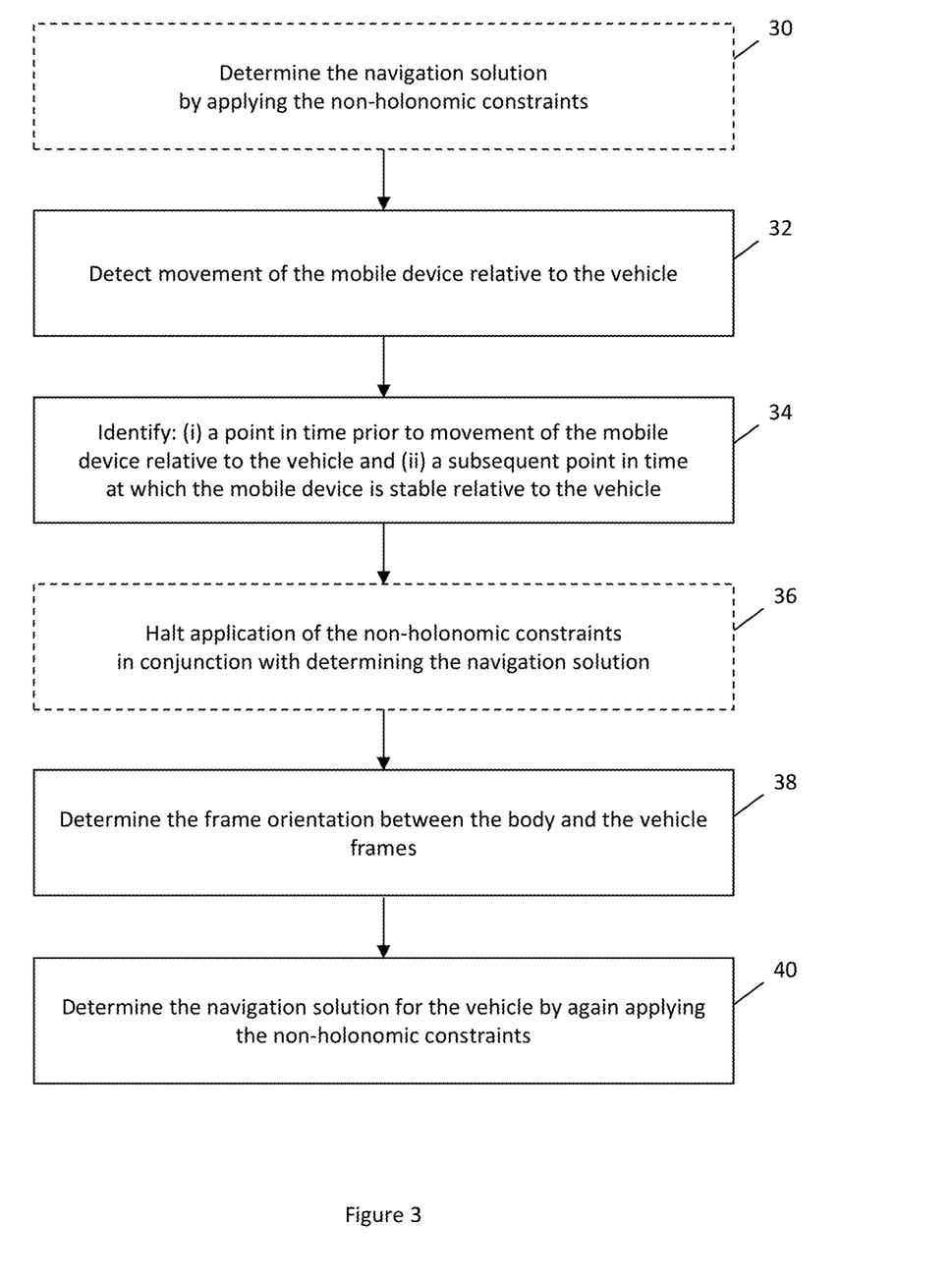
FIG. 3 is a flow chart illustrating the operations performed such as by the apparatus to FIG. 2, in order to recover the frame orientation between the body and vehicle frames for an INS in accordance with an example embodiment.

Referring now to FIG. 3, the operations performed, such as by the apparatus 20 of FIG. 2, in order to recover the frame orientation between the body and vehicle frames for an INS following movement of the mobile device 10 with respect to the vehicle 12 are depicted. As shown in block 30, the apparatus includes means, such as the processing circuitry 22 or the like, for determining the navigation solution for the vehicle, such as by determining the position and velocity of the vehicle, by applying the non-holonomic constraints while the mobile device is carried by the vehicle with a misalignment between the body and vehicle frames that has been previously estimated. By applying the non-holonomic constraints in which the velocities in the lateral and vertical directions are set equal to 0 or substantially equal to 0, the apparatus, such as the processing circuitry, is configured to provide motion data to the INS indicative of the amount of movement of the vehicle and the direction of movement of the vehicle since the position of the vehicle was previously determined, such as by a satellite-based positioning technique, e.g., a GNSS-based positioning technique. As such, the INS, which may be embodied by or in communication with the apparatus, is configured to utilize dead reckoning to determine the position of the vehicle based upon the position of the vehicle that was previously determined, such as by a satellite-based positioning technique, in combination with the motion data provided by the apparatus, such as an IMU embodied by the apparatus, for the period of time subsequent to the time at which the position of the vehicle was previously determined.

By applying the non-holonomic constraints, the impact of drift of the sensors 28 upon the position of the vehicle 12 that is determined may be reduced. However, the improvement with respect to the navigation solution provided by the INS as a result of the application of the non-holonomic constraints is dependent upon the misalignment between the body and vehicle frames remaining the same.

In some instances, however, the mobile device 10 may be moved relative to the vehicle 12, thereby altering the misalignment between the body and vehicle frames and reducing the accuracy of the position of the vehicle that is subsequently determined since continued application of the non-holonomic constraints will now be based upon an outdated estimation of the misalignment between the body and vehicle frames. The mobile device may be moved relative to the vehicle in various manners and for various purposes. For example, in an embodiment in which the mobile device is a mobile telephone that is temporarily mounted within a holder on the dash of a vehicle, the mobile telephone may be moved relative to the vehicle by a user who picks the mobile telephone from the holder, such as to place a call, review map data or the like.

In order to limit the deleterious effect of continued application of the non-holonomic constraints following movement of the mobile device 10 relative to the vehicle 12, the apparatus 20 also includes means, such as the processing circuitry 22, one or more sensors 28 or the like, for detecting movement of the mobile device relative to the vehicle. See block 52 of FIG. 3. The apparatus, such as the processing circuitry, may be configured to detect movement of the mobile device relative to the vehicle in any of a variety of different manners.

For example, the apparatus 20 of an example embodiment includes means, such as the processing circuitry 22, one or more sensors 28 or the like, for determining that the mobile device 10 has moved relative to the vehicle 12 based upon a comparison of vehicle orientation as determined by the INS with respect to one or more predefined conditions. For a vehicle traveling along a road or other surface, the one or more predefined conditions may be conditions that would not be experienced by the vehicle during normal operation and, instead, are indicative of the movement of the mobile device relative to the vehicle. By way of example, a vehicle generally remains in a relatively level orientation with pitch remaining within +/−20°, roll remaining within +/−15° and the average magnitude of the three dimensional rotation rate over a sample window remaining below 140° per second. In this example, the apparatus, such as the processing circuitry, is configured to determine that the mobile device has moved relative to the vehicle in an instance in which one or more of the pitch, roll and average magnitude of the three dimensional rotation rate exceed or otherwise fall outside of the foregoing values. As the foregoing example demonstrates, the apparatus, such as the processing circuitry, of this example embodiment is configured to determine that the vehicle orientation as determined by the INS fails to satisfy one of the predefined conditions, such as by having an orientation that would not be experienced by the vehicle during normal operation, the apparatus, such as the processing circuitry, is configured to detect movement of the mobile device relative to the vehicle.

Figure 4:
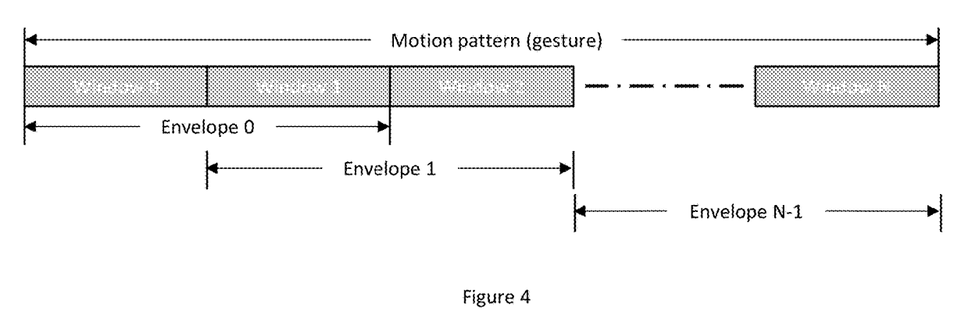
FIG. 4 illustrates a motion pattern divided into N windows with adjacent windows forming an envelope for use in conjunction with gesture recognition in accordance with an example embodiment.

In another example embodiment, the apparatus 20 includes means, such as the processing circuitry 22, one or more sensors 28 or the like, for detecting movement of the mobile device 10 relative to the vehicle 12 based upon the detection of a pattern of features extracted from sensor samples of the INS. In this regard, the apparatus, such as the processing circuitry, is configured to perform gesture recognition to identify an instance in which the mobile device has been moved relative to the vehicle. Although gesture recognition may be performed in various manners, the apparatus, such as the processing circuitry, of an example embodiment is configured to apply multivariate feature recognition to provide for motion estimation and gesture recognition. In one example embodiment, the apparatus, such as the processing circuitry, is configured to divide a motion pattern of the mobile device relative to the vehicle into N windows with each window having an identical length as shown in FIG. 4. A plurality, such as two, of the adjacent windows may form an envelope. By dividing the motion pattern into a plurality of windows, components of a gesture that are performed during different periods may be temporally distinguished from one another.

In this example embodiment, the apparatus 20, such as the processing circuitry 22, is configured to determine the feature vector for a respective envelope by combining the feature patterns extracted from the sensor(s) 28, such as accelerometer(s) and/or gyroscope(s). While various feature patterns may be combined to form the feature vectors, examples include the mean, maximum and/or variance of the amplitude of the sensor samples and the correlation among the axes in the time-space domain. In an example embodiment, the feature-type set also includes orientation and target pose angle information so as to constrain the search space. In this regard, the orientation can be estimated utilizing a navigation filter driven by, for example, a, gyroscope, or an accelerometer-derived pose. In an example embodiment, the determination of the orientation may be dependent upon the mode of operation of the mobile device, such as portrait mode or landscape mode, and the apparatus, such as the processing circuitry, may be configured to estimate the pitch and roll with respect to the general pose assumption, e.g., the general pose associated with portrait or landscape mode. The apparatus, such as the processing circuitry, of this example embodiment may be configured to detect an instance of limited misalignment between the mobile device and the vehicle, such as +/−10 degrees of tilt, and allow uncertainty weighting based on the misalignment angle between the mobile device and the vehicle, such as between the body and vehicle frames. The apparatus, such as the processing circuitry, of this example embodiment may be configured to provide gesture inference in various manners including, for example, by utilizing a multivariate maximum likelihood algorithm, a support vector machine (SVM) or various machine learning techniques, such as k-RNN (Repetitive Nearest Neighbor) and/or random-forest techniques.

The apparatus 20, such as the processing circuitry 22, may be configured to monitor the position of the mobile device 10 relative to the vehicle 12 in a continuous or repeated manner in order to detect movement of the mobile device relative to the vehicle. In other example embodiments, however, the apparatus, such as the processing circuitry, may be triggered by an event in order to make a determination as to whether or not the mobile device has moved relative to the vehicle. As such, the apparatus, such as the processing circuitry, of these example embodiments need not monitor for relative movement in a continuous manner. For example, the apparatus of an example embodiment includes means, such as the processing circuitry, one or more sensors 28 or the like, for triggering a determination as to whether the mobile device has moved relative to the vehicle based upon user action relative to the mobile device. In this regard, the mobile device may include a sensor, such as a touch sensor, a proximity sensor or the like, for identifying an instance in which the user reaches for or interacts with the mobile device, thereby triggering a determination as to whether the mobile device has moved relative to the vehicle. Additionally or alternatively, the one or more sensors may include a camera configured to capture images of the user and/or the mobile device such that the apparatus, such as the processing circuitry, is configured to perform image processing of the captured images in order to identify an instance in which the user reaches for or otherwise interacts with the mobile device, thereby also triggering a determination as to whether the mobile device has moved relative to the vehicle.

As shown in block 34 of FIG. 3, the apparatus 20 also includes means, such as the processing circuitry 22 or the like, for identifying, in response to detecting movement of the mobile device 10 relative to the vehicle 12, (i) a point in time prior to or corresponding to commencement of movement of the mobile device relative to the vehicle, and (ii) a subsequent point in time at which the mobile device is stable relative to the vehicle. In an example embodiment, the point in time prior to or corresponding to commencement of the movement of the mobile device relative to the vehicle is identified since the movement of the mobile device is not generally detected until some time after the movement has commenced. As such, several sensor samples have likely been processed while subject to the non-holonomic constraints after the movement of the mobile device relative to the vehicle has begun and prior to or corresponding to commencement of the detection of the movement, thereby leading to a navigation solution that has diminished accuracy. By identifying the point in time prior to or corresponding to commencement of the movement of the mobile device relative to the vehicle, the errant processing may be reversed and the sensor samples during the period of time after the movement of the mobile device relative to the vehicle has begun and prior to or corresponding to commencement of the detection of the movement may again be processed without application of the non-holonomic constraints in order to generate a navigation solution with improved accuracy, albeit likely with less accuracy than if the mobile device were not moved relative to the vehicle and the non-holonomic constraints were properly applied.

The apparatus 20, such as the processing circuitry 22, may be configured to identify the point in time prior to or corresponding to commencement of movement of the mobile device 10 relative to the vehicle 12 in various manners. In an embodiment in which the apparatus, such as the processing circuit, is configured to trigger a determination as to whether the mobile device has moved relative to the vehicle based upon user action relative to the mobile device, the apparatus may also include means, such as the processing circuitry or the like, for identifying the point in time based upon the point in time at which the user action relative to the mobile device commences. In this example embodiment, the point in time prior to or corresponding to commencement of movement of the mobile device relative to the vehicle may be identified to be the point in time at which the user action relative to the mobile device commences.

Figure 5:
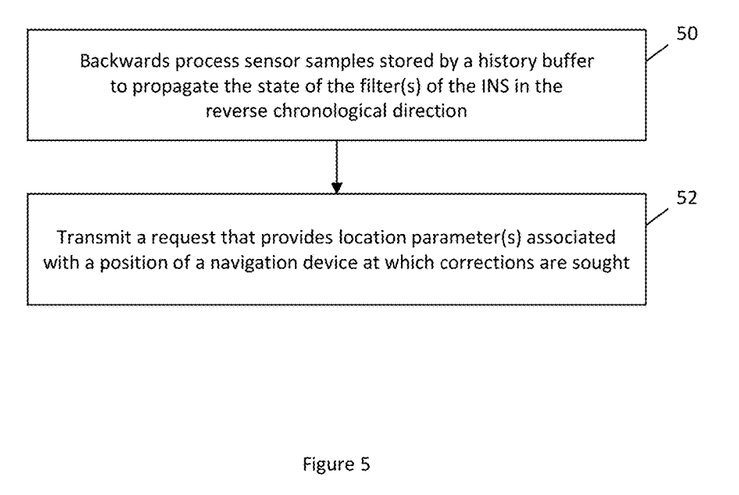
FIG. 5 is a flow chart illustrating the operations performed, such as by the apparatus of FIG. 2, in order to identify a point in time prior to or corresponding to commencement of movement of the mobile device relative to the vehicle in accordance with an example embodiment.

Alternatively, the apparatus 20, such as the processing circuitry 22, of an example embodiment is configured to identify the point in time prior to or corresponding to commencement of movement of the mobile device 10 relative to the vehicle 12 by backwards processing sensor samples stored in a history buffer 29 in order to propagate the state of one or more filters of the INS in a reverse chronological direction. See block 50 of FIG. 5. In this regard, a history buffer is maintained so as to store the sensor samples captured by the one or more sensors 28 in association with an identification of the time at which the sensor samples were captured. Additionally, the history buffer may store filter parameters of the one or more filters of the INS in association with an indication of the time at which the filter parameters were valid. As such, the apparatus, such as the processing circuitry, of this example embodiment is configured to process the sensor samples stored by the history buffer beginning with the most recent sensor samples and then proceeding in a reverse chronological direction so as to thereafter process prior sensor samples stored in the history buffer. As a result of the backwards processing, the state of the one or more filters of the INS is correspondingly propagated from the current state of the filter(s) of the INS to a prior state of the filter(s) of the INS.

In this example embodiment, the apparatus 20 also includes means, such as the processing circuitry 22 or the like, for identifying the point in time prior to or corresponding to commencement of movement of the mobile device 10 relative to the vehicle 12 based upon stabilization of the orientation of the vehicle. See block 52 of FIG. 5. In this regard, the apparatus, such as the processing circuitry, is configured to process the sensor samples stored by the history buffer 29 in a reverse chronological direction while updating the state of the filter(s) of the INS. The apparatus, such as the processing circuitry, this example embodiment is also configured to determine the orientation of the vehicle at a plurality of the prior points in time for which the sensor samples were backward processed with the orientation being determined based at least in part on the state of the filter(s) of the INS at the prior points in time. In order to identify the point in time prior to or corresponding to commencement of the movement of the mobile device relative to the vehicle, the apparatus, such as the processing circuitry, of this example embodiment is configured to identify the point in time at which the orientation of the vehicle stabilizes, such as by remaining constant or varying by no more than a predefined amount or percentage over a predefined period of time. The point in time at which the orientation of the vehicle is determined to be stabilized is then identified as the point in time prior to or corresponding to commencement of the movement of the mobile device relative to the vehicle.

In another example embodiment, the apparatus 20 is configured to identify the point in time prior to or corresponding to commencement of the movement of the mobile device 10 relative to the vehicle 12 by including means, such as the processing circuitry 22 or the like, for backwards processing sensor samples stored in the history buffer 29 in order to propagate the state of the one or more filters of the INS in a reverse chronological direction as described above. See block 60 of FIG. 6. In this example embodiment, the apparatus also includes means, such as the processing circuitry or the like, for identifying the point in time prior to or corresponding to commencement of moving the mobile device relative to the vehicle based upon a comparison of: (i) the state of the one or more filters of the INS as determined from the backwards processing to (ii) the state of the one or more filters of the INS as defined by the filter parameters of the one or more filters of the INS that are also stored by the history buffer. See block 62 of FIG. 6. Upon identifying that the state of the filter(s) of the INS as determined from the backwards processing equals or is within a predefined range of the state of the filter(s) of the INS as defined by the filter parameters of the filter(s) of the INS that are also stored by the history buffer, the apparatus, such as the processing circuitry, is configured to identify the point in time at which the state of the filters correspond, e.g., are equal or substantially equal, to be the point in time prior to or corresponding to commencement of movement of the mobile device relative to the vehicle.

Figure 6:
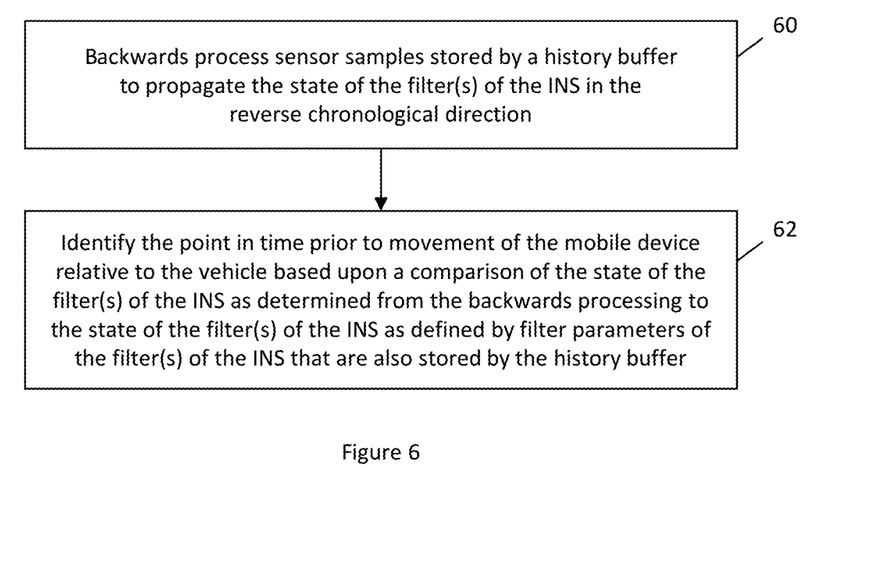
FIG. 6 is a flow chart illustrating the operations performed, such as by the apparatus of FIG. 2, in order to identify a point in time prior to or corresponding to commencement of movement of the mobile device relative to the vehicle in accordance with another example embodiment.

With respect to backwards processing, the forward system equation may be defined as:

$$\dot{x} = Fx + n$$

wherein x is the state vector of a filter, $\dot{x}$ is the change in the filter state, F is the state transition vector and n is the noise component. By substituting the following:

$$\tau = T - t, T = t(k) - t(k-N)$$

wherein T is the target time epoch, t or t(k) is the current time epoch, k is the discrete (time) epoch index and N is the number of steps (epochs), the backward system equation that is utilized during backwards processing is as follows:

$$\frac{dx}{d\tau} = \frac{dx}{dt}\frac{dt}{d\tau} = -\dot{x}$$

which may also be represented as:

$$\frac{dx_b}{d\tau} = -Fx_b - n$$

And correspondingly the equation for the covariance of the backwards propagation is:

$$\dot{P}_b = -FP_b - P_b F^T + Q$$

P is the covariance matrix of the filter state, $F^T$ is the transpose of F, Q is the process noise contribution to the covariance matrix and b represents backwards propagation. The backwards processing is then performed and continued until an end criterion is met, such as the end criterion described above, or until the backwards processing has been performed for a predetermined time. Upon identifying the point in time prior to or corresponding to commencement of the movement of the mobile device 10 relative to the vehicle, the apparatus 20, such as the processing circuitry 22, may be configured to store the time epoch and orientation parameters, e.g., pose quaternion and misalignment.

Also, the apparatus 20, such as the processing circuitry 22, may be configured to identify the subsequent point in time by monitoring the movement of the mobile device 10 relative to the vehicle 12 and identifying the time at which the mobile device is has not moved relative to the vehicle, at least not more than a predefined amount or percentage, for at least a predefined amount of time, at which point in time the mobile device is again considered stable relative to the vehicle. The subsequent point in time may be the point in time substantially corresponding to completion of the movement of the mobile device relative to the vehicle, such as the subsequent point in time at which the mobile device is no longer moving relative to the vehicle but is, instead, fixed in position relative to the vehicle, albeit potentially with a different misalignment between the body and vehicles frames than previously estimated. As described below, the subsequent point in time is determined because the non-holonomic constraints may then again be applied once the misalignment between the body and vehicles frames has been re-estimated, thereby improving the accuracy of the resulting navigation solution.

Although the subsequent point in time may be identified in various manners including by monitoring relative movement between the mobile device 10 and the vehicle, the apparatus 20, such as the processing circuitry 22, of an example embodiment is configured to identify the subsequent point in time by performing forward processing of the sensor samples from the point in time prior to or corresponding to commencement of the movement of the mobile device relative to the vehicle, albeit without application of the non-holonomic constraints until a stable orientation of the mobile device with respect to the vehicle is identified or, if a stable orientation is not identified, until the forward processing has proceeded for a predefined period of time.

In relation to forward processing the sensor samples, the apparatus 20 of an example embodiment includes means, such as the processing circuitry 22 or the like, for forward processing sensor samples of the INS from the point in time prior to or corresponding to commencement of movement of the mobile device 10 relative to the vehicle 12 that was previously identified. In this regard, the apparatus, such as the processing circuitry, is configured to forward process the sensor samples by utilizing filter parameters of one or more filters of the INS and sensor samples stored by the history buffer 29, albeit without application of the non-holonomic constraints. In other words, beginning at the point in time that has been identified prior to or corresponding to commencement of movement of the mobile device relative to the vehicle, the apparatus, such as the processing circuitry, is configured to utilize the filter parameters of the filter(s) of the INS and sensor samples stored by the history buffer and associated with instances of time coinciding with or subsequent to the point in time that has been identified to be prior to or corresponding to commencement of movement of the mobile device relative to the vehicle in order to determine a navigation solution for the vehicle including, for example, the position of the vehicle during the period of time after movement of the mobile device relative to the vehicle was detected. Based upon the forward processing, the apparatus, such as the processing circuitry, is also configured to determine various positional and/or rotational parameters of the mobile device including the orientation of the mobile device.

The apparatus 20, such as the processing circuitry 22, may be configured to forward process the sensor samples of the INS to the subsequent point in time at which the mobile device 10 is again stable relative to the vehicle 12, such as by maintaining a misalignment between the body and vehicle frames that remains the same or varies by no more than a predefined amount or percentage over a period of time. Upon identifying the subsequent point in time at which the mobile device is stable relative to the vehicle, the apparatus, such as the processing circuitry, may be configured to store the time epoch and orientation parameters, e.g., pose quaternion and misalignment.

Upon detecting movement of the mobile device 10 relative to the vehicle 12, the apparatus 20 of an example embodiment also includes means, such as the processing circuitry 22 or the like, for halting application of the non-holonomic constraints in conjunction with the determination of a navigation solution. See block 36 of FIG. 3. In this regard, the movement of the mobile device relative to the vehicle that is detected alters the misalignment between the body and vehicle frames. As the improvement in the accuracy of the navigation solution that is brought about by the application of the non-holonomic constraints is dependent upon the misalignment between the body and vehicle frames remaining the same as previously estimated, the movement of the mobile device relative to the vehicle alters the misalignment such that application of the non-holonomic constraint would no longer improve the accuracy of the navigation solution, but, instead, would increase the error associated therewith. As such, upon detecting the movement of the mobile device relative to the vehicle, the apparatus, such as the processing circuitry, is configured to halt application of the non-holonomic constraints in conjunction with the determination of the navigation solution including, for example, the determination of the position of the vehicle as a result of the forward processing of the sensor samples of the INS as described above.

In this example embodiment, as a result of the forward processing of the sensor samples, the apparatus 20, such as the processing circuitry 22, is configured to determine the orientation of the mobile device 10 at the subsequent point in time at which the mobile device is again stable relative to the vehicle 12. Thereafter, the apparatus includes means, such as the processing circuitry or the like, for determining the frame orientation between the body and vehicle frames. See block 38 of FIG. 3. The frame orientation between the body and vehicle frames may be determined in various manners. In an example embodiment depicted in FIG. 7, however, the apparatus includes means, such as the processing circuitry or the like, for determining a difference in orientation between: (i) the orientation of the mobile device at the point in time prior to or corresponding to commencement of movement of the mobile device relative to the vehicle and (ii) the orientation of the mobile device at the subsequent point in time at which the mobile device is stable relative to the vehicle. See block 70 of FIG. 7. The apparatus of this example embodiment also includes means, such as the processing circuitry or the like, for determining the frame orientation based upon the frame orientation at the point in time prior to or corresponding to commencement of movement of the mobile device relative to the vehicle and also based upon the difference in orientation. See block 72. In this regard, such as in an instance in which the vehicle is not currently in motion, the frame orientation at the point in time prior to or corresponding to commencement of movement of the device may be modified, e.g., increased or decreased, by the difference in orientation in order to define the frame orientation between the body and vehicle frame at the point in time at which the mobile device is stable relative to the vehicle.

Figure 7:
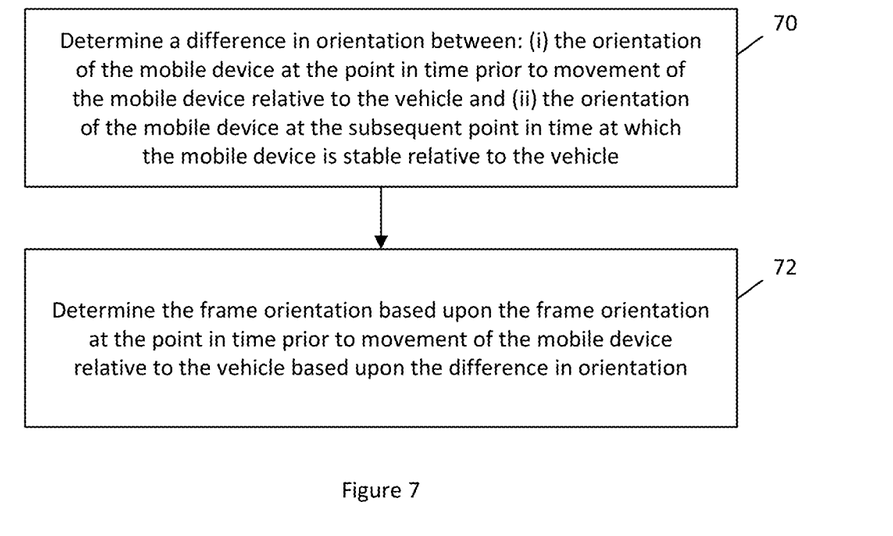
FIG. 7 is a flow chart illustrating the operations performed, such as by the apparatus of FIG. 2, in order to determine the frame orientation between the body and vehicle frames in accordance with an example embodiment.

In another example embodiment, the apparatus 20 is configured to determine the frame orientation between the body and vehicle frames by including means, such as the processing circuitry 22 or the like, for determining the frame orientation based upon a velocity of the vehicle 12 at the point in time at which the mobile device 10 is stable relative to the vehicle. In this regard, the velocity of the vehicle including the direction in which the vehicle is moving is considered to represent the frame orientation at the point in time at which the mobile device is stable relative to the vehicle.

As shown in block 40 of FIG. 3, the apparatus 20 also includes means, such as the processing circuitry 22 or the like, for determining, based upon the determined frame orientation between the body and vehicle frames, a navigation solution for the vehicle 12 in reliance upon the non-holonomic constraints. In this regard, once the mobile device 10 is again stable relative to the vehicle and the frame orientation between the body and vehicle frame at that subsequent point in time at which the mobile device is stable relative to the vehicle has been determined, the apparatus, such as the processing circuitry, is configured to again determine the navigation solution, such as the position along and rotation about, each of the coordinate axes of the body frame, while relying upon the application of the non-holonomic constraint. By relying upon the non-holonomic constraint once the misalignment between the body and vehicle frames has again been determined following movement of the mobile device relative to the vehicle, the apparatus, such as the processing circuitry, is configured to increase the accuracy of the navigation solution relative to the navigation solution provided in an instance in which the non-holonomic constraints are not applied.

The apparatus 20, method, and computer program product of an example embodiment thereby improve the accuracy with which the navigation solution is determined by applying the non-holonomic constraints in an instance in which a fixed misalignment is maintained between the body and vehicle frame, but halts application of the non-holonomic constraints in an instance in which the mobile device is detected to be moving relative to the vehicle. However, even in an instance in which the mobile device is detected to be in motion relative to the vehicle, movement of the mobile device relative to the vehicle is monitored and, in an instance in which the mobile device becomes stable relative to the vehicle, the apparatus, method, and computer program product of an example embodiment are configured to re-estimate the misalignment between the body and vehicle frame in a timely manner such that the navigation solution may then be determined with application of the non-holonomic constraint subject to the misalignment that has been re-estimated.

As described above, FIGS. 3 and 5-7 are flow diagrams of an apparatus 20, method, and computer program product configured to facilitate recovery of the frame orientation between the body and vehicle frames for an INS following movement of a mobile device defining the body frame with respect to a vehicle defining the vehicle frame according to an example embodiment. It will be understood that each block of the flow diagrams, and combinations of blocks in the flow diagrams, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the blocks of the flow diagrams. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flow diagrams.

Accordingly, blocks of the flow diagrams support combinations of means for performing the specified functions and combinations of operations for performing the specified functions. It will also be understood that one or more blocks of the flow diagrams, and combinations of blocks in the flow diagrams, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the blocks outlined by a dashed line in FIG. 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for recovering of frame orientation between body and vehicle frames for an inertial navigation system (INS) following movement of a mobile device defining the body frame with respect to a vehicle defining the vehicle frame, the method comprising:
   detecting movement of the mobile device relative to the vehicle based on a comparison of vehicle orientation with a predefined vehicle orientation threshold;
   in response to detecting movement of the mobile device relative to the vehicle, identifying (i) a point in time prior to or corresponding to commencement of movement of the mobile device relative to the vehicle and (ii) a subsequent point in time at which the mobile device is stable relative to the vehicle, wherein identifying the subsequent point in time comprises forward processing sensor samples of the INS from the point in time prior to or corresponding to commencement of movement of the mobile device relative to the vehicle to the subsequent point in time at which the mobile device is stable relative to the vehicle, and wherein forward processing the sensor samples comprises utilizing filter parameters of one or more filters of the INS and sensor samples stored by a history buffer without application of non-holonomic constraints;
   following forward processing to the subsequent point in time at which the mobile device is stable relative to the vehicle, determining the frame orientation between body and vehicle frames; and
   based upon the determined frame orientation between body and vehicle frames, determining a navigation solution for the vehicle in reliance upon non-holonomic constraints.

2. A method according to claim 1, wherein the navigation solution applies the non-holonomic constraints before detecting the movement of the mobile device, and wherein the method further comprises:
   in response to detecting the movement of the mobile device, halting application of the non-holonomic constraints.

3. A method according to claim 1, wherein identifying the subsequent point in time at which the mobile device is stable relative to the vehicle comprises identifying the subsequent point in time substantially corresponding to completion of the movement of the mobile device relative to the vehicle.

4. A method according to claim 1, wherein detecting movement of the mobile device relative to the vehicle comprises determining that the mobile device has moved relative to the vehicle based upon a comparison of vehicle orientation as determined by the INS with respect to one or more predefined conditions.

5. A method according to claim 1, wherein detecting movement of the mobile device relative to the vehicle comprises detecting a pattern of features extracted from the sensor samples of the INS to be indicative of movement of the mobile device relative to the vehicle.

6. A method according to claim 1, wherein detecting movement of the mobile device relative to the vehicle comprises triggering a determination as to whether the mobile device has moved relative to the vehicle based upon a user action relative to the mobile device.

7. A method according to claim 1, wherein identifying the point in time prior to or corresponding to commencement of movement of the mobile device relative to the vehicle comprises identifying the point in time based upon a point in time at which the user action relative to the mobile device commences.

8. A method according to claim 1, wherein identifying the point in time prior to movement of the mobile device relative to the vehicle comprises:

backwards processing sensor samples stored by a history buffer in order to propagate a state of one or more filters of the INS in a reverse chronological direction from the state of the one or more filters of the INS to a prior state of the one or more filters of the INS; and identifying the point in time prior to or corresponding to commencement of movement of the mobile device relative to the vehicle based upon stabilization of an orientation of the vehicle, and wherein identifying the subsequent point in time at which the mobile device is stable relative to the vehicle comprises forward processing sensor samples of the INS from the point in time prior to or corresponding to commencement of movement of the mobile device relative to the vehicle to the subsequent point in time at which the mobile device is stable relative to the vehicle, wherein forward processing the sensor samples comprises utilizing filter parameters of the one or more filters of the INS and the sensor samples stored by the history buffer without application of the non-holonomic constraints.

9. A method according to claim 1, wherein identifying the point in time prior to or corresponding to commencement of movement of the mobile device relative to the vehicle comprises:

backwards processing sensor samples stored by a history buffer in order to propagate a state of one or more filters of the INS in a reverse chronological direction from the state of the one or more filters of the INS to a prior state of the one or more filters of the INS; and identifying the point in time prior to or corresponding to commencement of movement of the mobile device relative to the vehicle based upon a comparison of the state of the one or more filters of the INS as determined from the backwards processing to the state of the one or more filters of the INS as defined by filter parameters of the one or more filters of the INS that are also stored by the history buffer, and wherein identifying the subsequent point in time at which the mobile device is stable relative to the vehicle comprises forward processing sensor samples of the INS from the point in time prior to or corresponding to commencement of movement of the mobile device relative to the vehicle to the subsequent point in time at which the mobile device is stable relative to the vehicle, wherein forward processing the sensor samples comprises utilizing the filter parameters of one or more filters of the INS and the sensor samples stored by the history buffer without application of the non-holonomic constraints.

10. A method according to claim 1, wherein determining the frame orientation between the body and vehicle frames comprises:

determining a difference in orientation between the orientation of the mobile device at the point in time prior to or corresponding to commencement of movement of the mobile device relative to the vehicle and the orientation of the mobile device at the subsequent point in time at which the mobile device is stable relative to the vehicle; and determining the frame orientation based upon the frame orientation at the point in time prior to or corresponding to commencement of movement of the mobile device relative to the vehicle and also based upon the difference in orientation.

11. A method according to claim 1, wherein determining the frame orientation between the body and vehicle frames comprises determining the frame orientation based upon a velocity of the vehicle at the point in time at which the mobile device is stable relative to the vehicle.

12. An apparatus configured to recover frame orientation between body and vehicle frames for an inertial navigation system (INS) following movement of a mobile device defining the body frame with respect to a vehicle defining the vehicle frame, the apparatus comprising at least one processor and at least one memory including computer program code, the at least one memory and the computer program code configured to, with the at least one processor, cause the apparatus at least to:

detect movement of the mobile device relative to the vehicle based on a comparison of vehicle orientation with a predefined vehicle orientation threshold;

in response to detecting movement of the mobile device relative to the vehicle, identify: (i) a point in time prior to or corresponding to commencement of movement of the mobile device relative to the vehicle and (ii) a subsequent point in time at which the mobile device is stable relative to the vehicle, wherein the apparatus is caused to identify the subsequent point in time by forward processing sensor samples of the INS from the point in time prior to or corresponding to commencement of movement of the mobile device relative to the vehicle to the subsequent point in time at which the mobile device is stable relative to the vehicle, and wherein the apparatus is caused to forward process the sensor samples by utilizing filter parameters of one or more filters of the INS and sensor samples stored by a history buffer without application of non-holonomic constraints;

following forward processing to the subsequent point in time at which the mobile device is stable relative to the vehicle and responsive to an instance in which the vehicle is not in motion, determine the frame orientation between body and vehicle frames; and based upon the determined frame orientation between body and vehicle frames, determine a navigation solution for the vehicle in reliance upon the non-holonomic constraints.

13. An apparatus according to claim 12, wherein the navigation solution applies the non-holonomic constraints before detecting the movement of the mobile device, and wherein the at least one memory and the computer program code are further configured to, with the at least one processor, cause the apparatus to:

in response to detecting the movement of the mobile device, halt application of the non-holonomic constraints.

14. An apparatus according to claim 12, wherein the at least one memory and the computer program code are configured to, with the at least one processor, cause the apparatus to identify the subsequent point in time at which the mobile device is stable relative to the vehicle by identifying the subsequent point in time substantially corresponding to completion of the movement of the mobile device relative to the vehicle.

15. An apparatus according to claim 12, wherein the at least one memory and the computer program code are configured to, with the at least one processor, cause the apparatus to identify the point in time prior to or corresponding to commencement of movement of the mobile device relative to the vehicle by:

backwards processing sensor samples stored by the history buffer in order to propagate a state of the one or more filters of the INS in a reverse chronological direction from the state of the one or more filters of the INS to a prior state of the one or more filters of the INS; and identifying the point in time prior to or corresponding to commencement of movement of the mobile device relative to the vehicle based upon stabilization of an orientation of the vehicle.

16. An apparatus according to claim 12, wherein the at least one memory and the computer program code are configured to, with the at least one processor, cause the apparatus to identify the point in time prior to or corresponding to commencement of movement of the mobile device relative to the vehicle by:

backwards processing sensor samples stored by the history buffer in order to propagate a state of the one or more filters of the INS in a reverse chronological direction from the state of the one or more filters of the INS to a prior state of the one or more filters of the INS; and identifying the point in time prior to or corresponding to commencement of movement of the mobile device relative to the vehicle based upon a comparison of the state of the one or more filters of the INS as determined from the backwards processing to the state of the one or more filters of the INS as defined by the filter parameters of the one or more filters of the INS that are stored by the history buffer.

17. A computer program product configured to recover frame orientation between body and vehicle frames for an inertial navigation system (INS) following movement of a mobile device defining the body frame with respect to a vehicle defining the vehicle frame, the computer program product comprising at least one non-transitory computer-readable storage medium having computer-executable program code instructions stored therein, and wherein the computer-executable program code instructions comprise program code instructions to:

detect movement of the mobile device relative to the vehicle based on a comparison of vehicle orientation with a predefined vehicle orientation threshold;

in response to detecting movement of the mobile device relative to the vehicle, identify: (i) a point in time prior to or corresponding to commencement of movement of the mobile device relative to the vehicle and (ii) a subsequent point in time at which the mobile device is stable relative to the vehicle, wherein the program code instructions to identify the subsequent point in time comprise program code instructions to forward process sensor samples of the INS from the point in time prior to or corresponding to commencement of movement of the mobile device relative to the vehicle to the subsequent point in time at which the mobile device is stable relative to the vehicle, and wherein program code instructions configured to forward process the sensor samples comprise program code instructions configured to utilize filter parameters of one or more filters of the INS and sensor samples stored by a history buffer without application of non-holonomic constraints;

following forward processing to the subsequent point in time at which the mobile device is stable relative to the vehicle, determine the frame orientation between body and vehicle frames; and based upon the determined frame orientation between body and vehicle frames, determine a navigation solution for the vehicle in reliance upon the non-holonomic constraints.

18. A computer program product according to claim 17, wherein the navigation solution applies the non-holonomic constraints before detecting the movement of the mobile device, and wherein the computer-executable program code instructions further comprise program code instructions to:

in response to detecting the movement of the mobile device, halt application of the non-holonomic constraints.

19. A computer program product according to claim 17, wherein the program code instructions configured to identify the point in time prior to or corresponding to commencement of movement of the mobile device relative to the vehicle comprise program code instructions to:

backwards process sensor samples stored by the history buffer in order to propagate a state of the one or more filters of the INS in a reverse chronological direction from the state of the one or more filters of the INS to a prior state of the one or more filters of the INS; and identify the point in time prior to or corresponding to commencement of movement of the mobile device relative to the vehicle based upon stabilization of an orientation of the vehicle.

20. A computer program product according to claim 17, wherein the program code instructions to identify the point in time prior to or corresponding to commencement of movement of the mobile device relative to the vehicle comprise program code instructions to:

backwards process sensor samples stored by the history buffer in order to propagate a state of the one or more filters of the INS in a reverse chronological direction from the state of the one or more filters of the INS to a prior state of the one or more filters of the INS; and identify the point in time prior to or corresponding to commencement of movement of the mobile device relative to the vehicle based upon a comparison of the state of the one or more filters of the INS as determined from the backwards processing to the state of the one or more filters of the INS as defined by the filter parameters of the one or more filters of the INS that are stored by the history buffer.

* * * * *